UNITED STATES PATENT OFFICE.

ARTHUR BAGNALL, OF BALTIMORE, MARYLAND.

COMPOSITION FOR ENAMELING.

SPECIFICATION forming part of Letters Patent No. 556,727, dated March 24, 1896.

Application filed July 25, 1895. Serial No. 557,098. (No specimens.)

*To all whom it may concern:*

Be it known that I, ARTHUR BAGNALL, of Baltimore, in the State of Maryland, have invented new and useful Improvements in Compositions for Enameling; and I do hereby declare the following to be a full, clear, and exact description of said invention.

My invention relates to the composition of materials employed in producing enameled surfaces on bricks, tiles, and analogous objects or articles; and the particular object of my invention is the production of a composition which, when applied to the surface of the article and the latter burned in a kiln, will insure a durable and brilliant finish that cannot be impaired by the action of the elements, even though portions of the enameled surface may have become accidentally cracked or broken, as sometimes occurs either through the carelessness of the workman or the settling or movement of a wall or floor composed of such articles.

Heretofore, in order to obtain the best results or the most pleasing effects, it has been a common practice to provide the surface to be coated with a base of some kind for the enamel; but such base is usually more or less porous and permits climatic influences to seriously impair the surface of a wall or floor whenever a crack or break once occurs in the enameled surface of any of the bricks or tiles. It has also been a common practice to make the brick or tile of a particular kind of clay or a particular combination of minerals treated, molded, or burned in a special manner in order to lessen the disastrous effects of accidental crack or break of the enameled surface.

An ordinary brick or tile finished with my improved composition of enamel and without an intermediate base for the latter may be used for all ordinary purposes with slight liability of becoming surface cracked or broken and without risk of being affected by varying climatic conditions, even if portions of the enameled surface should be damaged, owing to such contingencies as above mentioned.

The said improved composition consists of the following materials, and I prefer to employ them in the proportions stated, although it is to be understood that I am not restricted to the exact figures given: eighty parts of feldspar, sixty-five parts of whiting, sixty-five parts of flint, fifty parts of oxide of zinc, fifty parts of boracic acid, twenty parts of china-clay, and thirty-seven and one-half parts of oxide of tin. This mixture is fritted—that is to say, fused in a kiln under a high temperature sufficient to transform it into a homogeneous mass, after which it is pounded into a powder and then ground in a mill with water, the proportion of the latter being such that the wet composition weighs about twenty-four ounces to the pint.

An ordinary brick or tile having no base applied thereto for the enamel may be coated with the paste or composition either by dipping the portion to be enameled in said composition or by applying the latter directly to the surface of the brick or tile with a spatula or brush. Then the coated article will be placed in the kiln and subjected to the heat necessary to fuse the enamel—viz., about 2,200° Fahrenheit.

In connection with the materials above stated I may employ any coloring ingredients to produce color or tints desired or preferred, and the composition may be used for enameling other articles than bricks and tiles—such as porcelain, china, or earthenware utensils—or articles for interior decoration, such as panels or finger-plates for doors.

Having now described my invention, what I claim is—

A composition for enamel, consisting of feldspar, whiting, flint, oxide of zinc, boracic acid, china-clay and oxide of tin, in substantially the proportions set forth, fused to a homogeneous mass and powdered in water.

In testimony whereof I affix my signature in presence of two subscribing witnesses.

ARTHUR BAGNALL.

Witnesses:
R. S. GOODMAN,
D. C. FORNEY.